United States Patent [19]

Wilkinson

[11] 4,206,325
[45] Jun. 3, 1980

[54] ELECTRICAL SWITCH

[75] Inventor: Norman Wilkinson, Nelson, England

[73] Assignee: Lucas Industries Limited, Birmingham, England

[21] Appl. No.: 910,515

[22] Filed: May 30, 1978

[30] Foreign Application Priority Data

Jun. 21, 1977 [GB] United Kingdom ............... 26142/77

[51] Int. Cl.² .............................................. H01H 9/00
[52] U.S. Cl. .................................... 200/4; 200/61.27; 200/291; 340/56
[58] Field of Search ............ 200/4, 17 R, 17 A, 17 B, 200/18, 61.27–61.38, 61.54, 291; 340/56, 54

[56] References Cited

U.S. PATENT DOCUMENTS

| | | | |
|---|---|---|---|
| 3,557,328 | 1/1971 | Winogrocki | 200/61.27 |
| 4,129,757 | 12/1978 | Cryer | 200/61.54 |

*Primary Examiner*—J. V. Truhe
*Assistant Examiner*—Morris Ginsburg
*Attorney, Agent, or Firm*—Holman & Stern

[57] ABSTRACT

An electrical switch wherein a first contact member is movable relative to the switch body between first and second operative positions, and a second contact member is movable relative to the body also between respective first and second operative positions. The second contact member is movable independently of the first contact member and there is provided an arrangement whereby the second contact member is caused to be in a predetermined one of its first and second positions when the first contact member is moved into its second position from its first position. The arrangement ensures that the second contact member is in said one of the positions by moving the second contact member to that position as the first contact member is moved from its first position to its second position, in the event that the second contact member is not already in said one of its positions.

9 Claims, 3 Drawing Figures

ELECTRICAL SWITCH

This invention relates to electrical switches.

An electrical switch according to the invention includes a body, a first contact member movable relative to the body between first and second operative positions, a second contact member movable relative to the body between first and second operative positions independently of said first contact member, and means associated with said first and second contact members ensuring that said second contact member is in a predetermined one of its first and second positions when said first contact member is moved into its second position from its first position, said means ensuring that said second contact member is in said one of its positions as said first contact member is moved from its first position into its second position if the second contact member is not already in said one of its positions.

Preferably, said first contact member has a third operative position achieved by movement beyond the second operative position and there is provided further means associated with said first and second contact members ensuring that said second contact member is in the other of its first and second positions when said first contact member is moved into its third position from its second position, said further means ensuring that second contact member is in said other of said positions by moving the second contact member to said other of its positions as said first contact member is moved from its second position into its third position if the second contact member is not already in said other of its positions.

Conveniently, said further means ensures that the second contact member is in said other of its positions when said first contact member is moved into its second position from its third position.

Desirably said first contact member is movable relative to the body by movement of a manually operable operating member in a first mode and said second contact member is movable relative to the body by movement of said operating member in a second mode.

Preferably, said second contact member is bistable, being spring urged to occupy either of its first and second positions and said operating member is monostable in said second mode, a first displacement of the operating member from its rest position in said second mode moving the second contact member from its first position to its second position and a second subsequent and identical displacement of the operating member from its rest position in said second mode moving the second contact member from its second position back to its first position.

Conveniently movement of the operating member in said first mode is rotational movement of the operating member about a first axis extending longitudinally of the operating member and movement of the operating member in the second mode is pivotal movement of operating member about a second axis transverse to said first axis.

Desirably the operating member is movable also in a third mode, said movement in a third mode being movement about a third axis transverse to the first and second axes and movement in the third mode serving to move a third contact member between operative positions thereof relative to the body.

Preferably, said operating member includes an elongate stalk extending from the body.

One example of the invention is illustrated in the accompanying drawings wherein.

Figure 1:
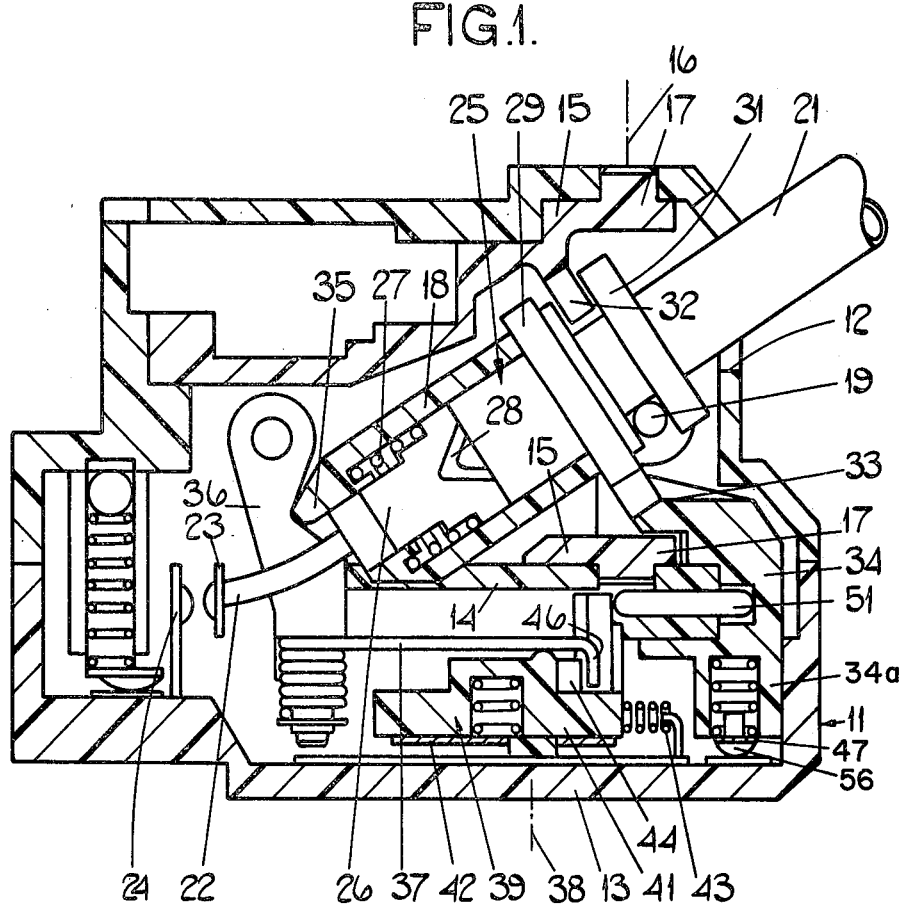
FIG. 1 is a diagrammatic sectional view of a combined direction indicator and lighting control switch for a road vehicle.

Referring to the drawings, the switch includes a hollow, two-part moulded synthetic resin body 11, having an aperture 12 in one wall thereof. One part of the two-part body 11 defines the base 13 of the body and secured within the body adjacent the base 13 is a moulded synthetic resin sub-base part of which is shown at 14.

A moulded synthetic resin rotor 15 is housed within the body 11 and is supported within the body for pivotal movement relative thereto about an axis 16 extending at right angles to the base 13. The pivotal mounting of the rotor 15 is by way of a pair of aligned trunions 17 one of which is received in the wall of the body 11 remote from the base 13 and the other of which is received in the sub-base 14.

The rotor 15 is hollow and pivotally mounted within the rotor 15 is a pivot sleeve 18. The sleeve 18 is mounted within the rotor 15 for pivotal movement about an axis 19 extending perpendicular to the axis 16. However, the axis 19 is displaced from the plane of the axis 16 so as not to intersect the axis 16. The axes 16, and 19 lie however in mutually perpendicular planes. The longitudinal axis of the sleeve 18 extends perpendicular to, but does not intersect the pivotal axis 19 of the sleeve 18.

Engaged at one end in the sleeve 18 and extending at its other end from the body 11 by way of the aperture 12, is a hollow elongate lever 21. At its free end remote from the sleeve 18 the lever 21 carries an axially slidable knob (not shown) having secured thereto a flexible nylon rod 22 which extends through the hollow lever 21 and the pivot sleeve 18 and terminates within the body 11 adjacent a leaf spring contact 23. The leaf spring contact 23 is normally maintained by its own resilience out of engagement with a fixed contact 24 but upon movement of the knob axially relative to the lever 21 towards the body 11 the rod 22 is displaced in a direction to move the contact 23 into engagement with the contact 24. Upon release of the knob a return spring together with the spring action of the contacts 23 returns the contacts 23, the rod 22, and the knob to a rest position wherein the contact 23 is again spaced from the contact 24.

The end portion of the lever 21 which is received within the sleeve 18 carries a moulded synthetic resin drive unit 25. The drive unit 25 and therefore the lever 21 are rotatable within the sleeve 18 about the longitudinal axis of the sleeve 18. The longitudinal axis of the sleeve 18 is of course co-extensive with the axis of the drive unit 25 and the adjacent end region of the lever 21.

Disposed within the sleeve 18 and adjacent the free end of the drive unit 25 is a detent block 26 formed from synthetic resin material and urged by a compression spring 27 towards the free end of the drive unit 25. The free end of the drive unit 25 and the mutually presented face of the block 26 define mating detent froms 28 which serve to define three stable angular positions of the lever 21 and drive unit 25 relative to the sleeve 18 about the axis thereof.

The drive unit 25 is formed integrally with a drive gearwheel 29 and a star wheel 31, the two wheels being parallel and spaced in the direction of the axis of the drive unit 25. A part 32 of the rotor 15 extends between the drive wheel 29 and the star wheel 31 to limit axial movement of the drive unit 25 and lever 21 relative to the rotor 15 and the part 32 is slotted so as to be able to mate with the point of the star wheel 31 in the three predetermined rotated positions of the drive unit relative to the sleeve 18 when the drive unit 25, sleeve 18 and lever 21 are pivotted in a counter clockwise direction about the axis 19. The purpose of the inter-engagement of the star wheel 31 and the rotor part 32 when pivotting the lever 21, drive unit 25 and sleeve 18 about the axis 19 is to prevent rotation of the drive unit 25 relative to the sleeve 18 in the pivotted position.

The drive gearwheel 29 meshes with a linear toothed rack 33 formed integrally with a moulded synthetic resin slide 34. The slide 34 is received in the body 11 adjacent the base 13 for sliding movement in a direction parallel to the axis 19. Rotation of the drive unit 29 relative to the sleeve 18 thus causes linear sliding movement of the slide 34 in a direction parallel to the axis 19.

The end of the sleeve 18 remote from the lever 21 is formed with a projection 35 which engages in a V-shaped recess in an arm 36. The arm 36 is pivotally mounted in the body 11 for swinging movement about an axis parallel to the axis 19 and at its free end the arm 36 carries a spring steel limb 37 extending parallel to the base 13. The sleeve 18, drive unit 25 and lever 21 are shown in FIG. 1 in a rest position about the axis 19 from which they can be displaced in a counter-clockwise direction. Displacement of the sleeve 18 in the counter-clockwise direction causes the projection 35 to co-operate with the arm 36 to move the arm 36 in a clockwise direction about its pivot axis thus moving the limb 37 to the left in FIG. 1.

Pivotally mounted in the sub-base 14 for pivotal movement about an axis 38 parallel to the axis 16, is a contact member 39 comprising a moulded synthetic resin body 41 pivotally mounted by way of trunions in the sub-base 14 and a copper contact plate 42 carried by the body 41 and spring urged towards the base 13.

The pivotal movement of the contact member 39 is restricted to approximately 30° on opposite sides of a central position. The two limit positions are thus spaced apart by approximately 60° and the arrangement is such that the two limit positions are both stable operative positions of the contact member 39. A compression spring 43 acts between the body 41 and a fixed abutment upstanding from the base 13 and a point on the axis 38, the abutment upstanding from the base, and the point of engagement between the spring 43 and the body 41 are all aligned in the mid-position of the contact member 39. Since the spring 43 is a compression spring the mid-position is thus an unstable position and the contact member 39 is bistable having its two limit positions as its only stable positions. It will be understood that if the member 39 is in its central position then it will move under the action of the spring 43 to either of its limit positions dependent upon the side of the central position to which it is displaced.

The upper surface of the body 41 to the side of the axis 38 remote from the arm 36 is formed with a recess 44 partly filled by a triangular projection 45 pointing away from the arm 36 in the plane of the body 41. The free end of the spring limb 37 is bent downwardly towards the body 41 and can engage in the recess 44.

The limb 37 passes through the axis 38 and is aligned with the fixed abutment of the spring 43 and thus upon clockwise pivotting movement of the arm 36 the end 46 of the limb 37 engages in the recess 44 to one side or other of the projection 45 dependent upon the position of the member 39 and upon abutting the base of the recess causes pivotal movement of the member 39 from the existing stable position beyond the centre-point so that it is moved into its other stable position. The sleeve 18 and arm 36 are spring biassed towards a rest position, and it will be understood therefore that a first displacement of the lever 21 from its rest position about the axis 19 will move the member 39 from its first stable position to its second stable position, and a second, subsequent and identical movement of the lever 21 from its rest position about the axis 19 will move the member 39 from its second stable position back to its first stable position. Similarly, a third, and identical movement of the lever 21 will once again return the member 39 from its first to its second stable position and so on.

The slide 34 defines an integral contact member consisting of the lower part 34a of the moulded synthetic resin slide 34 and a contact plate 47 carried thereby. The contact plate 47 is spring urged towards the base 13.

Figure 2:
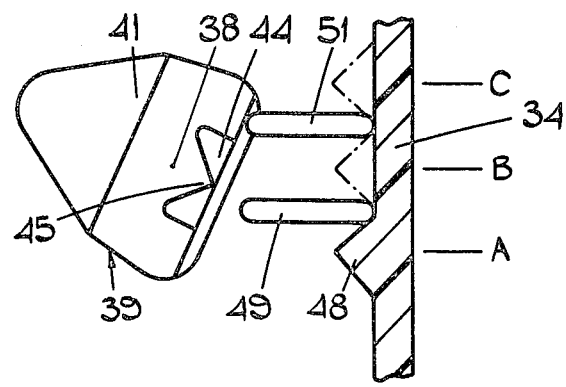
FIG. 2 is a diagrammatic representation of part of the lighting switching arrangement of FIG. 1.

The slide 34 is formed in a face presented to the contact member 39 with a triangular projection 48 (FIG. 2.) The projection 48 can co-operate during sliding movement of the slide 34 with either of a pair of pins 49, 51 supported for sliding movement towards and away from the contact member 39 in bores in the sub-base 14. The pins are disposed on opposite sides respectively of the imaginary line passing through the abutment of the spring 43 and the axis 38 and the height of the projection 48 is such as to cause a sufficient displacement of either of the pins 49, 51 during linear sliding movement of the slide 34 for one or other of the pins to push the member 39 over-centre so that it is moved from one of its stable positions to its other stable position. The operation of this particular part of the switch will be described in more detail below.

Figure 3:
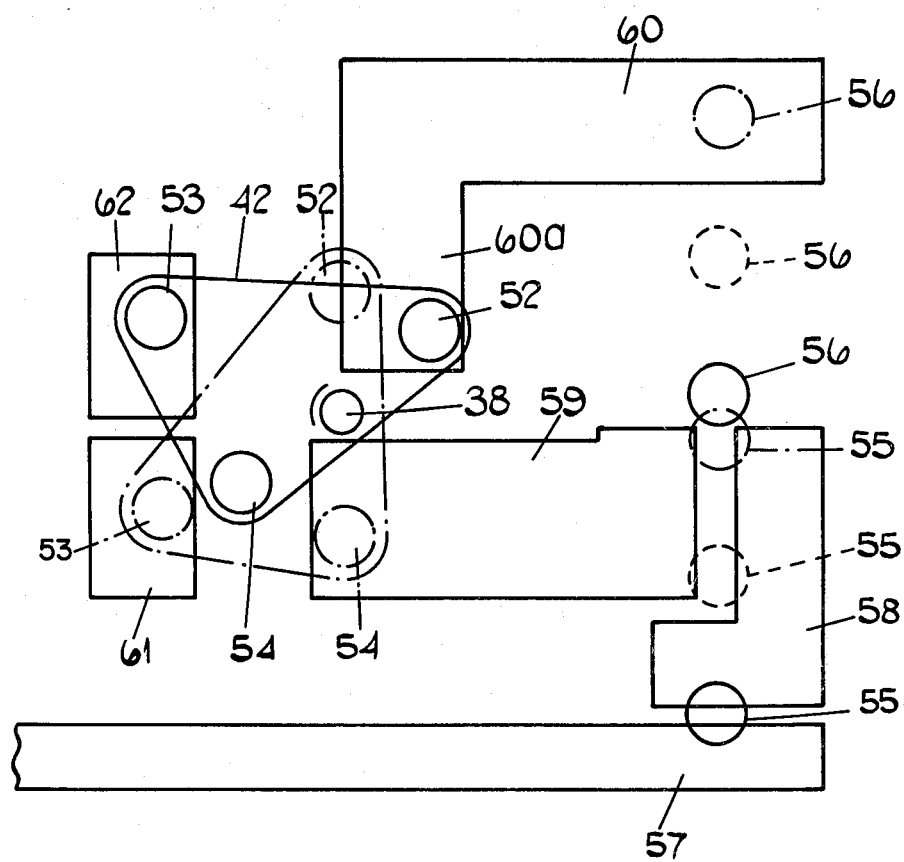
FIG. 3 is a diagrammatic representation of the lighting contact arrangement of the switch.

The contact plate 42 of the contact member 39 is triangular and is formed with three contact projections 52, 53, 54 (FIG. 3) at its apiece respectively. The contact plate 47 is in the form of a straight strip having a pair of contact projections 55, 56. The triangular outline of the contact plate 42 is shown in FIG. 3 while the rectangular outline of the plate 47 is omitted in the interests of clarity. Giving particular attention to FIG. 3 it can be seen that the contact plate 42 is shown in both stable positions. One of the stable positions is shown in full lines while the other stable position is shown in chain dotted lines. It can be seen that the movement between the two positions takes place about the axis 38. Similarly, the contact plate 47 has three stable positions and the contact projections 55, 56 are thus shown in FIG. 3 in three different positions. The first stable position is shown by the solid line representations, the second stable position is shown by the broken line representation and the third stable position is shown by the chain dotted line representations. The three stable positions of the contact plate 47 of course correspond to three stable positions of the slide 34 in its linear movement. Since the slide 34 is moved solely by rotation of the drive unit 25 then three stable positions of the slide 34 are the three stable rotational positions of the drive unit 25 defined by the detent components 28.

The contact plate 42, 47 co-operate with fixed contacts provided on the base 13. The fixed contacts are defined on the base 13 by pieces of copper sheet or foil secured to the base and having electrically connected thereto terminals which extend from the exterior of the body 11. The fixed contacts and their relationship to the moving contact plates is illustrated diagrammatically in FIG. 3. There is provided a contact strip 57 and adjacent the contact strip 57 is a contact 58 which is in use an electrical feed contact. The contacts 57, 58 are bridged by the projection 55 of contact plate 47 in the first position of the contact plate 47. In the first position of the contact plate 47 the other projection 56 is riding on an insulating part of the base. Adjacent the feed contact 58 is a contact 59, the contacts 58 and 59 being arranged to be bridged by the projection 55 in both the second and third positions of the contact plate 47. In the second position of the contact plate 47 the projection 56 is again riding on an insulating part of the base. Spaced from the contacts 58, 59 in the direction of movement of the plate 47 is a further contact 60 so positioned as to be engaged by the contact projection 56 in the third position of the contact plate 47. Thus in the third position of the contact plate 47 the projection 55 bridges contacts 58 and 59 while the projection 56 engages the contact 60 whereby the contacts 58, 59 and 60 are electrically interconnected by the contact plate 47. The contact 60 includes a limb 60a which is engaged by the projection 52 in both the first (chain dotted) stable position and the second (full lines) stable position, of the contact plate 42. The contact 59 is elongated sufficiently to be engaged by the projection 54 of the contact plate 42 in the first stable position, and there is provided a further contact 61 which is engaged by the projection 53 of the plate 42 in the first stable position. In the second stable position of the plate 42 (shown in FIG. 3 in full lines) the projection 54 of plate 42 engages an insulating region of the base and the projection 53 engages a further contact 62. Thus in the first position of the plate 42 (shown in chain dotted lines) the plate 42 bridges contacts 60, 59 and 61 and in the second position the plate 42 bridges contacts 60 and 62.

The detailed operation of the switch is best understood by reference to a specific working example and although the switch can be used to control other functions the remaining description will be on the basis of the switch used to control the direction indicator and lighting functions of a road vehicle.

The direction indicator function is not of particular importance to the present invention, and thus will not be described in detail. The direction indicator function requires a central off position and a pair of operative positions on opposite sides respectively of the central off position in which different circuits are made. The direction indicator function is achieved by moving the lever 21 in a direction to pivot the rotor, and thus all parts carried by the rotor about the axis 16. A detent arrangement is provided on the rotor and the body for defining the central off position and the two operative positions, and there is provided a contact member carrying a contact plate engaging fixed contacts provided on the body. In one of the operative positions a first electrical circuit between external terminals of the switch is completed while in the other stable position a second different electrical circuit is completed. In use the external terminals associated with the direction indicator function are connected in the direction indicator circuits of the vehicle. A self cancelling arrangement whereby the rotor may be returned from either operative position to its rest position by rotation of the steering wheel can be incorporated if desired.

The contacts 23, 24 described above control operation of the horn of the vehicle, the horn being energised in use by depressing the knob at the free end of the lever 21.

The whole of the lighting function, that is to say the operation of the main and dipped beams of the headlights, the flashing of the main beams of the headlights, and the operation of the side and tail lights of the vehicle is controlled by angular movement of the lever about the axis 19 and by rotation of the lever.

The contact 58 is connected to one pole of the vehicle battery, the other pole of the battery being earthed. The contact 58 is thus an electrical feed contact for the switch. The contact strip 57 is associated with the function of flashing the main beams of the headlamps and provided that the switch is a further set of normally open contacts (not shown) which are closed by moving the lever 21 about the axis 19 from its rest position. It will be undestood that these contacts are closed every time the lever 21 is moved about the axis 19 from its rest position but they serve to cause flashing of the headlamps only when the slide 34 is in its first position since it is only in the first position that there is an electrical connection to the strip 57. In the first position the strip 57 is connected to the feed contact 58 by the projection 55 of the contact plate 47. In the second and third positions of the slide 34, that is to say the second and third rotated positions of the lever 21 and drive unit 25 the projection 55 does not bridge the contacts 57, 58 and thus closure of the headlamp flash contacts has no effect on the headlamps.

The contact 59 is connected to the side and tail lamp circuits of the vehicle and thus when the contacts 58, 59 are electrically interconnected the side and tail lamps of the vehicle will be energised. The contact 60 is an auxiliary feed contact and does not have an external electrical connection. The contact 60 only serves a specific function in the third stable position of the slide 34 where the contact 60 is electrically connected to the contact 58 by way of the contact plate 47. The contact 61 is connected in the dipped beam circuit of the headlamps of the vehicle and the contact 62 is connected in the main beam circuit. The headlamp flash contacts mentioned above in fact when closed serve to bridge the strip 57 and the contact 62 although this is not shown in FIG. 3.

In the first position of the slide 34, that is to say the first rotated position of the lever 21 the feed contact 58 is connected only to the strip 57 and thus movement of the lever 21 about the axis 19 will serve only to flash the headlamps. The side and tail lamps and the permanent main and dipped beam circuits will not be energised. Nevertheless, the movement of the lever 21 to flash the headlamps will move the contact plate 42 between its stable positions. In the first rotated position of the lever 21 the movement of the contact plate 42 has no effect.

In the second rotated position of the lever 21 that is to say the second position of the slide 34, the projection 55 of plate 47 electrically connects the contact 58 to the contact 59. Thus the side and tail lamps of the vehicle are energised, and when the plate 42 is in its first stable position then the dipped beams of the headlamps will also be energised since the plate 42 bridges the contacts 59, 61. However, in the second stable position of the plate 42 the projection 54 is displaced from the contact 59 and although the contacts 62 and 60 are bridged by the plate 42 this has no effect since there is no electrical connection to the contacts 60. Thus movement of the plate 42 in the second stable position of rotation of the lever 21 from the second stable position to the first stable position switches on the dipped beams of the headlights in addition to the side and tail lights and movement of the plate 42 from its first stable position to its second stable position switches off the dipped beams. It will be understood that the switching on and off of the dipped beams is performed by exactly the same movement of the lever 21 about the axis 19 by virtue of the bistable action of the contact member 39.

In the third stable rotated position of the lever 21, the contacts 58 and 59 remain interconnected but in addition an electrical feed is made to the contact 60. Thus in the first stable position of the plate 42 the feed to the dipped beam contact 61 remains and in the second stable position the contacts 60 and 62 are bridged so that the main beams of the headlamps are energised by way of the contact plate 47 in the contact 60, the limb 60a, and the contact plate 42. In this position of course the dipped beams are not energised and thus movement of the lever 21 repeatedly from its rest position about the axis 19 does not affect the side and tail lights but repeatedly switches the headlamps from main beam to dip and back again.

From the foregoing comments the basic operation of the lighting operation can be understood. However there are additional requirements of the lighting system in that it is essential that when moving from rotational position one to rotational position two the lights of the vehicle should be switched on in the side and tail lamp only condition. It will be appreciated however, that if as the lever 21 reaches its second rotated position the contact member 39 is in its first stable position then not only will the side and tail lamps be energised, but also the dipped beams. This is undesirable. Similarly, when moving from the second rotational position of the lever 21 to the third rotational position it is a requirement that the lighting shall immediately upon reaching the third position, be side and tail lamps energised and dipped, beams energised. As will be appreciated if, upon reaching the third rotated position, the contact member 39 is in its second stable position then the main beams of the head lamps will immediately be energised in conjunction with the side and tail lamps and not the dipped beams as is required. Similarly when rotating from the third stable position back to the second stable position it is required that upon reaching the second stable position the situation should be that the side and tail lamps together with the dipped beams of the headlamps are energised and it will be recognised that this will only be the case if upon reaching the second position from the third position the contact member 39 is in its first stable position.

The projection 48 of the slide 34 together with the pins 49 and 51 which co-operate with the projection 48 and the body 41 of the contact member 39 ensure that the above requirements are fulfilled. Thus it will be understood that in the first rotating position of the lever 21 and immediately prior to rotating to the second stable position the contact member 39 can be in either of its first and second positions. FIG. 2 shows the three stable positions of the slide 34 as A, B and C and also shows the member 39 in its second stable position. Thus the slide 34 moves from the first stable position (A) to the second stable position (B) the pin 49 will be moved by the projection 48 towards the body 41. However, since the body 41 is in its second stable position no movement of the body 41 will take place. Thus immediately upon the slide 34 reaching the second position the side and tail lamps of the vehicle will be energised alone since the contact plate 42 is in its second stable position. However, had the contact member 39 been in its first stable position, then the movement of the pin 49 as a result of co-action with the projection 48 would have pivotted the contact member 39 sufficiently far in a clockwise direction to move the member 39 from its first stable position beyond its centre position so that the spring 43 would cause the member 39 to move into its second stable position. Thus even if the member 30 were in its first stable position the movement of the slide 34, as a result of rotation of the lever 21 from the first position to the second position ensures that the member 39 is moved to its second position so that only the side and tail lamps of the vehicle are energised by rotation of the lever to the second position. When in the second position of course movement of the lever 21 about the axis 19 will switch the lighting function between a situation where the side and tail lamps are energised and a situation where the side and tail lamps together with the dipped beams of the headlamps are energised.

Similarly when moving from the second stable position (B) to the third stable position (C) the co-operation between the projection 48 and the pin 51 ensures that the contact member 39 is in its first stable position as the slide 34 reaches its third stable position. The pin 51 thus tips the member 39 over centre to achieve its first stable position if it is not already in the first stable position as the slide 34 moves from the second stable position to the third stable position. Thus as the lever 21 is rotated into the third stable position the side and tail lamps together with the dipped beams of the headlamps will be illuminated. Thereafter movement of the lever 21 about the axis 19 serves to switch the headlamps between their main and dipped beam conditions. Upon return movement of the slide 34 from its third stable position to its second stable position the pin 51 again ensures that upon reaching the second stable position from the third stable position the member 39 is in its first stable position such that the side and tail lamps together with the dipped beams of the headlamps are energised and not merely the side and tail lamps. Lastly, and of less importance, movement of the slide 34 from its second stable position to its first stable position ensures that the member 39 is in its second stable position. Howevever, this is of little importance since the first position of the slide 34 the only possible lighting function is headlamp flash.

I claim:

1. An electrical switch including a body, a first contact member, means enabling said first contact member to move relative to the body between first, second and third operative positions, a second contact member, means enabling said second contact member to move relative to the body between first and second operative positions independently of said first contact member, and means, associated with said first and second contact members, for ensuring that said second contact member is in a predetermined one of its first and second positions when said first contact member is moved into its second position from its first position, said means ensuring that said second contact member is in said one of its positions as said first contact member is moved from its first position into its second position if the second contact member is not already in said one of its positions wherein said first contact member has a third operative position achieved by movement beyond the second operative position and said means also ensuring that said second contact member is in the other of its first and second positions when said first contact member is moved into its third position from its second position, said means ensuring that said second contact member is in said other of said positions by moving the second contact member to said other of its positions as said first contact member is moved from its second position into its third position if the second contact member is not already in said other of its positions.

2. A switch as claimed in claim 1 wherein said means ensures that the second contact member is in said other of its positions when said first contact member is moved into its second position from its third position.

3. A switch according to claims 1 or 2, including manually operable operating member means for moving said first contact member and said contact member about first and second axes, respectively, wherein said first contact member is movable relative to the body by movement of a manually operable operating member in a first mode and said second contact member is movable relative to the body by movement of said operating member in a second mode.

4. A switch as claimed in claim 3 wherein said second contact member is bistable, being spring urged to occupy either of its first and second positions and said operating member is monostable in said second mode, a first displacement of the operating member from its rest position in said second mode moving the second contact member from its first position to its second position and a second subsequent and identical displacement of the operating member from its rest position in said second mode moving the second contact member from its second position back to its first position.

5. A switch as claimed in claim 3 wherein movement of the operating member in said first mode is rotational movement of the operating member about a first axis extending longitudinally of the operating member and movement of the operating member in the second mode is pivotal movement of operating member about a second axis transverse to said first axis.

6. A switch as claimed in claim 4 wherein movement of the operating member in said first mode is rotational movement of the operating member about a first axis extending longitudinally of the operating member and movement of the operating member in the second mode is pivotal movement of operating member about a second axis transverse to said first axis.

7. A switch as claimed in claim 3 including a third contact member, wherein the operating member is movable also in a third mode, movement in said third mode being movement about a third axis transverse to the first and second axes and movement in the third mode serving to move said third contact member between operative positions thereof relative to the body.

8. A switch as claimed in claim 4, including a third contact member, wherein the operating member is movable also in a third mode, movement in said third mode being movement about a third axis transverse to the first and second axes and movement in the third mode serving to move said third contact member between operative positions thereof relative to the body.

9. A switch as claimed in claim 7 wherein said operating member includes an elongate stalk extending from the body.

* * * * *